(12) United States Patent
Amitai

(10) Patent No.: US 7,672,055 B2
(45) Date of Patent: Mar. 2, 2010

(54) SUBSTRATE-GUIDED OPTICAL DEVICES

(75) Inventor: Yaakov Amitai, Rehovot, IL (US)

(73) Assignee: Lumus Ltd., Rehovot (IL)

( * ) Notice: Subject to any disclaimer, the term of this patent is extended or adjusted under 35 U.S.C. 154(b) by 16 days.

(21) Appl. No.: 12/214,366

(22) Filed: Jun. 18, 2008

(65) Prior Publication Data

US 2008/0285140 A1 Nov. 20, 2008

Related U.S. Application Data

(63) Continuation of application No. 10/561,505, filed on Dec. 19, 2005, now Pat. No. 7,391,573.

(51) Int. Cl.
*G02B 27/14* (2006.01)

(52) U.S. Cl. .................. 359/630; 359/631; 359/487; 40/546

(58) Field of Classification Search ......... 359/630–634, 359/481, 487; 345/6–9; 385/31, 36; 40/546; 349/64; 238/10 A
See application file for complete search history.

(56) References Cited

U.S. PATENT DOCUMENTS

| | | | | |
|---|---|---|---|---|
| 2,795,069 | A * | 6/1957 | Hardesty | 40/546 |
| 2,886,911 | A * | 5/1959 | Hardesty | 40/546 |
| 4,191,446 | A * | 3/1980 | Arditty et al. | 385/42 |
| 4,516,828 | A | 5/1985 | Steele | |
| 4,711,512 | A | 12/1987 | Upatnieks | |
| 4,805,988 | A | 2/1989 | Dones | |
| 5,076,664 | A | 12/1991 | Migozzi | |
| 5,353,134 | A | 10/1994 | Michel et al. | |
| 5,369,415 | A | 11/1994 | Richard et al. | |
| 5,453,877 | A | 9/1995 | Gerbe et al. | |
| 5,724,163 | A | 3/1998 | David | |
| 6,384,982 | B1 | 5/2002 | Spitzer | |
| 6,671,100 | B1 | 12/2003 | McRuer | |
| 6,791,760 | B2 | 9/2004 | Janeczko et al. | |
| 6,829,095 | B2 | 12/2004 | Amitai | |
| 7,088,664 | B2 * | 8/2006 | Kim et al. | 369/112.19 |
| 7,205,960 | B2 | 4/2007 | David | |
| 2003/0218718 | A1 | 11/2003 | Moliton et al. | |
| 2008/0151379 | A1 * | 6/2008 | Amitai | 359/630 |
| 2008/0278812 | A1 * | 11/2008 | Amitai | 359/487 |

FOREIGN PATENT DOCUMENTS

| | | |
|---|---|---|
| EP | 0 365 406 | 10/1989 |
| EP | 0 399 865 | 11/1990 |
| EP | 0 543 718 | 12/1996 |
| FR | 2 721 872 | 1/1994 |
| GB | 2 272 980 | 1/1994 |
| WO | WO 98/15868 | 4/1998 |
| WO | WO 01/95027 | 12/2001 |
| WO | WO 03/081320 | 2/2003 |
| WO | WO 03/058320 | 7/2003 |

* cited by examiner

*Primary Examiner*—Loha Ben

(57) ABSTRACT

There is provided an optical device, having a light-transmitting substrate having at least two major surfaces (26) parallel to each other and edges; optical means (16) for coupling light waves located in a field-of-view into the substrate by internal reflection, and at least one partially reflecting surface (22) located in the substrate which is non-parallel to the major surfaces of the substrate, characterized in that at least one of the major surfaces is coated with a dichroic coating.

16 Claims, 5 Drawing Sheets

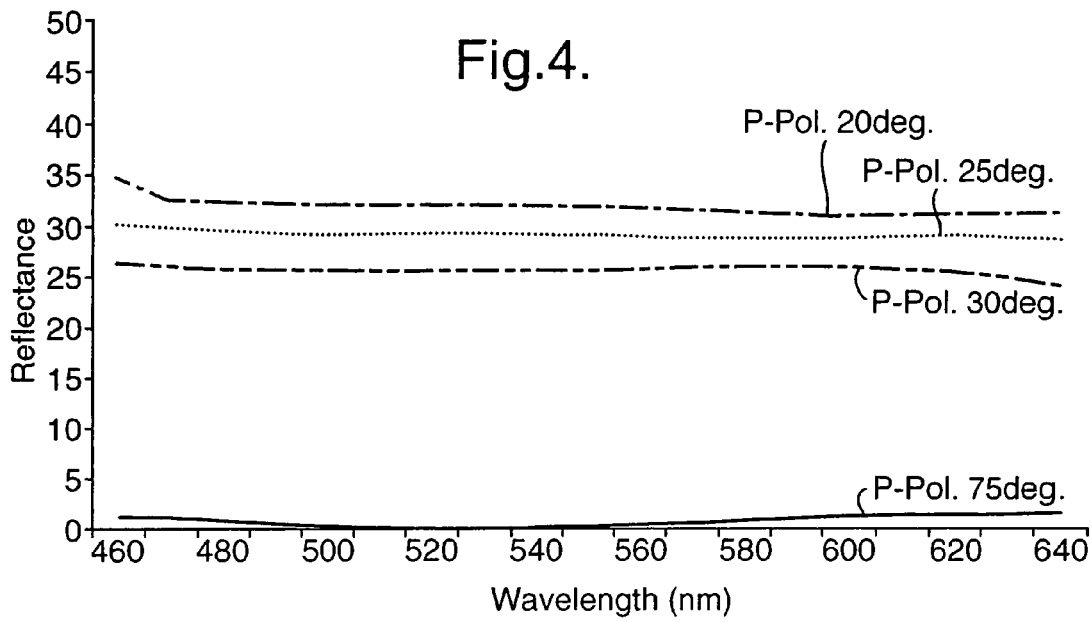
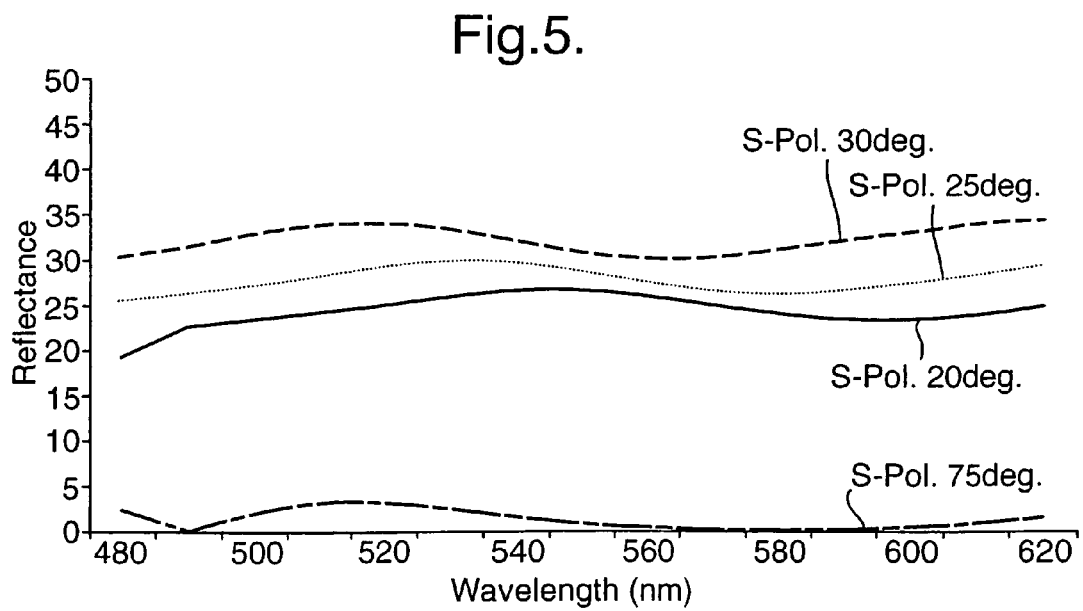

SUBSTRATE-GUIDED OPTICAL DEVICES

CROSS-REFERENCE TO RELATED APPLICATION

This application is a continuation of application Ser. No. 10/561,505, filed Dec. 19, 2005 for SUBSTRATE-GUIDED OPTICAL DEVICES, now U.S. Pat. No. 7,391,573 which is incorporated herein by reference.

FIELD OF THE INVENTION

The present invention relates to substrate-guided optical devices, and particularly to devices which include a plurality of reflecting surfaces carried by a common light-transmissive substrate, also referred to as a light-guide.

The invention can be implemented to advantage in a large number of imaging applications, such as, for example, head-mounted and head-up displays (HUD's and HUD's), cellular phones, compact displays, 3-D displays, compact beam expanders, as well as non-imaging applications such as flat-panel indicators, compact illuminators and scanners.

BACKGROUND OF THE INVENTION

One of the important applications for compact optical elements is in HMD's wherein an optical module serves both as an imaging lens and a combiner, in which a two-dimensional display is imaged to infinity and reflected into the eye of an observer. The display can be obtained directly from either a spatial light modulator (SLM) such as a cathode ray tube (CRT), a liquid crystal display (LCD), an organic light emitting diode array (OLED), or a scanning source and similar devices, or indirectly, by means of a relay lens or an optical fiber bundle. The display comprises an array of elements (pixels) imaged to infinity by a collimating lens and transmitted into the eye of the viewer by means of a reflecting or partially reflecting surface acting as a combiner for non-see-through and see-through applications, respectively. Typically, a conventional, free-space optical module is used for these purposes. As the desired field-of-view (FOV) of the system increases, such a conventional optical module becomes larger, heavier and bulkier,' and therefore, even-, for moderate performance devices, impractical. This is a major drawback for all kinds of displays but especially in head-mounted applications, wherein the system must necessarily be as light and as compact as possible.

The strive for compactness has led to several different complex optical solutions, all of which, on the one hand, are still not sufficiently compact for most practical applications, and, on the other hand, suffer major drawbacks in terms of manufacturability. Furthermore, the eye-motion-box (EMB) of the optical viewing angles resulting from these designs is usually very small—typically less than 8 mm. Hence, the performance of the optical system is very sensitive, even to small movements of the optical system relative to the eye of the viewer, and does not allow sufficient pupil motion for conveniently reading text from such displays.

DISCLOSURE OF THE INVENTION

The present invention facilitates the structure and fabrication of very compact light-guide optical elements (LOE) for, amongst other applications, head-mounted displays. The invention allows relatively wide FOV's together with relatively large EMB values. The resulting optical system offers a large, high-quality image, which also accommodates large movements of the eye. The optical system offered by the present invention is particularly advantageous because it is substantially more compact than state-of-the-art implementations and yet it can be readily incorporated, even into optical systems having specialized configurations.

The invention also enables the construction of improved HUD's. HUD's have become popular and they now play an important role, not only in most modern combat aircrafts, but also in civilian aircrafts, in which HUD systems have become a key component for low-visibility landing operation. Furthermore, there have recently been numerous proposals and designs for HUD's in automotive applications where they can potentially assist the driver in driving and navigation duties. Nevertheless, state-of-the-art HUD's suffer several significant drawbacks. All HUD's of the current designs require a display source that must be offset a significant distance from the combiner to ensure that the source illuminates the entire combiner surface. As a result, the combiner-projector HUD system is necessarily bulky and large, and requires considerable installation space, making it inconvenient for installation and, at times, even unsafe to use. The large optical aperture of conventional HUDs also pose a significant optical design challenge, rendering the HUD's with either a compromising performance, or leading to high cost wherever high-performance is required. The chromatic dispersion of high-quality holographic HUD's is of particular concern.

An important application of the present invention relates to its implementation in a compact HUD, which alleviates the aforementioned drawbacks. In the HUD design of the current invention, the combiner is illuminated with a compact display source that can be attached to the substrate. Hence, the overall system is very compact and can readily be installed in a variety of configurations for a wide range of applications. In addition, the chromatic dispersion of the display is negligible and, as such, can operate with wide spectral sources, including a conventional white-light source. In addition, the present invention expands the image so that the active area of the combiner can be much larger than the area that is actually illuminated by the light source.

A further application of the present invention is to provide a compact display with a wide FOV for mobile, hand-held application such as cellular phones. In today's wireless Internet-access market, sufficient bandwidth is available for full video transmission. The limiting factor remains the quality of the display within the end-user's device. The mobility requirement restricts the physical size of the displays, and the result is a direct-display with a poor image viewing quality. The present invention enables, a physically very compact display with a very large virtual image. This is a key feature in mobile communications, and especially for mobile Internet access, solving one of the main limitations for its practical implementation. Thereby, the present invention enables the viewing of the digital content of a full format Internet page within a small, hand-held device, such as a cellular phone.

A broad object of the present invention, therefore, is to alleviate the drawbacks of state-of-the-art compact optical display devices and to provide other optical components and systems having improved performance, according to specific requirements.

The invention therefore provides an optical device, comprising a light-transmitting substrate having at least two major surfaces parallel to each other and edges; optical means for coupling light waves located in a field-of-view into said substrate by internal reflection, and at least one partially reflecting surface located in said substrate which is non-parallel to said major surfaces of the substrate, characterized in that at least one of said major surfaces is coated with a dichroic coating.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 is a side view of a prior art folding optical device;

FIG. 2 is a side view of an embodiment of a LOE, in accordance with the present invention;

FIGS. 3A and 3B illustrate the desired reflectance and transmittance characteristics of selectively reflecting surfaces used in the present invention for two ranges of incident angles;

FIG. 4 illustrates the reflectance curves as a function of wavelength for an exemplary dichroic coating for P-polarization;

FIG. 5 illustrates a reflectance curve as a function of wavelength for an exemplary dichroic coating for S-polarization;

FIG. 6 illustrates the reflectance curves as a function of incident angle for an exemplary dichroic coating;

FIG. 7 is a diagram illustrating detailed sectional views of an exemplary array of selectively reflective surfaces;

FIG. 8 illustrates the reflectance curves as a function of incident angle for another dichroic coating;

FIG. 9 illustrates an exemplary embodiment of the present invention embedded in a standard eye-glasses frame; and FIG. 10 illustrates an exemplary HUD system in accordance with the present invention.

DETAILED DESCRIPTION OF PREFERRED EMBODIMENTS

Figure 1:
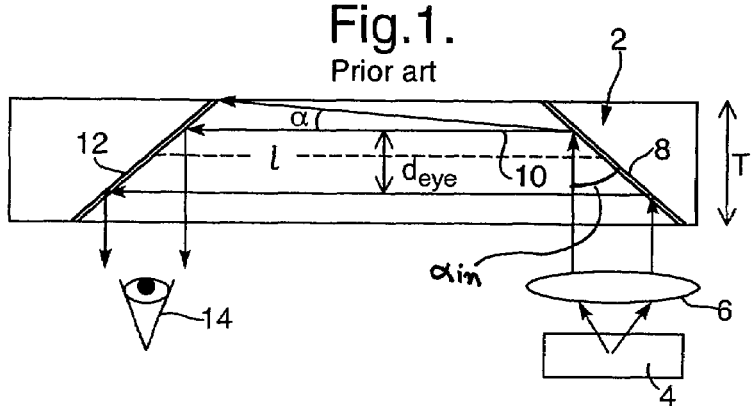

FIG. 1 illustrates a conventional folding optics arrangement, wherein the substrate 2 is illuminated by a display source 4. The display is collimated by a collimating lens 6. The light from the display source 4 is coupled into substrate 2 by a first reflecting surface 8, in such a way that the main ray 10 is parallel to the substrate plane. A second reflecting surface 12 couples the light out of the substrate and into the eye of a viewer 14. Despite the compactness of this configuration, it suffers significant drawbacks; in particular only a very limited FOV can be affected. As shown in FIG. 1, the maximum allowed off-axis angle inside the substrate is:

$$\alpha_{max} = \arctan\left(\frac{T - d_{eye}}{2l}\right), \quad (1)$$

wherein

T is the substrate thickness;

$d_{eye}$ is the desired exit-pupil diameter, and l is the distance between reflecting surfaces 8 and 12.

With angles higher than $\alpha_{max}$ the rays are reflected from the substrate surface before arriving at the reflecting surface 12. Hence, the reflecting surface 12 will be illuminated at an undesired direction and ghost images appear.

Therefore, the maximum achievable FOV with this configuration is:

$$FOV_{max} \approx 2\nu\alpha_{max}, \quad (2)$$

wherein $\nu$ is the refractive index of the substrate.

Typically the refractive index values lie in the range of 1.5-1.6.

Commonly, the diameter of the eye pupil is 2-6 mm. To accommodate movement or misalignment of the display, a larger exit-pupil diameter is necessary. Taking the minimum desirable value at approximately 8 to 10 mm, the distance between the optical axis of the eye and the side of the head, l, is, typically, between 40 and 80 mm. Consequently, even for a small FOV of 8°, the desired substrate thickness would be of the order of 12 mm.

Methods have been proposed to overcome the above problem. These include, utilizing a magnifying telescope inside the substrate and non-parallel coupling directions. Even with these solutions, however, and even if only one reflecting surface is considered, the system thickness remains limited by a similar value. The FOV is limited by the diameter of the projection of the reflective surface 12 on the substrate plane. Mathematically, the maximum achievable FOV, due to this limitation, is expressed as:

$$FOV_{max} \approx \frac{T\tan\alpha_{sur} - d_{eye}}{R_{eye}}, \quad (3)$$

wherein $\alpha_{sur}$ is the angle between the reflecting surface and the normal to the substrate plane, and $R_{eye}$ is the distance between the eye of the viewer and the substrate (typically, about 30-40 mm).

Practically tan $\alpha_{sur}$ cannot be much larger than 1; hence, for the same parameters described above for a FOV of 8°, the required substrate thickness here is on the order of 7 mm, which is an improvement on the previous limit. Nevertheless, as the desired FOV is increased, the substrate thickness increases rapidly. For instance, for desired FOVs of 15° and 30° the substrate limiting thickness is 18 mm or 25 mm, respectively.

Figure 2:
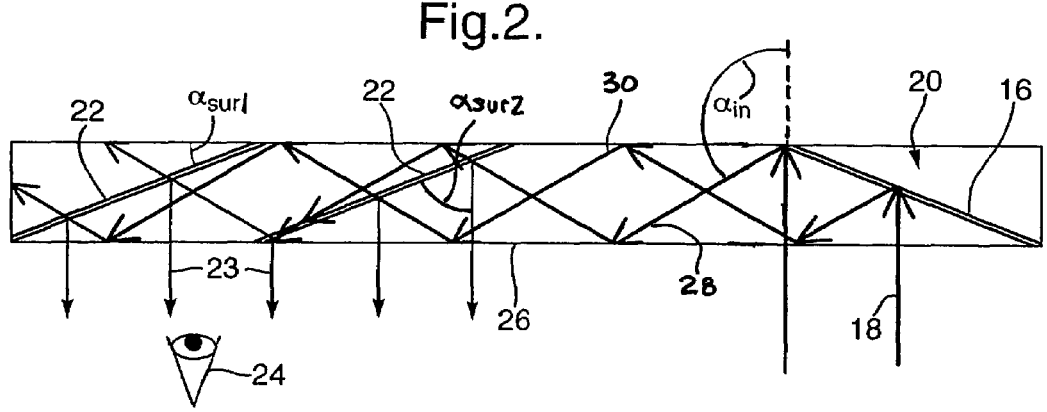

To alleviate the above limitations, the present invention utilizes an array of selectively reflecting surfaces, fabricated within a LOE. FIG. 2 illustrates a sectional view of an LOE according to the present invention. The first reflecting surface 16 is illuminated by a collimated input plane wave 18, emanating from a display light source (not shown) located behind the device, wherein the plane wave 18 is one of a set of light waves located within a given FOV to be coupled into the LOE. The reflecting surface 16 reflects the incident light from the source such that the light is trapped inside a planar substrate 20 by total internal reflection. After several reflections off the surfaces of the substrate, the trapped wave reaches an array of selectively reflecting surfaces 22, which couple the light wave 23 out of the substrate into the EMB 24 of a viewer. For avoiding ghost images, the output light wave 23 should be a plane wave, otherwise, different rays representing a single point at the display source will arrive at the EMB 24 of the viewer at different incident angles and ghost images that interfere with the primary image will be seen by the viewer. In order to prevent this phenomenon, the output light wave 23, and hence the input wave 18, should be plane waves. That is, the angular deviation between two different rays located on the same light wave should be less than $\alpha_{res}$, wherein $\alpha_{res}$ is the angular resolution of the optical device. Usually, for most visual systems, $\alpha_{res}$ is ~1-2 milliradians, but different devices can yield different angular resolutions.

Assuming that the central wave of the source is coupled out of the substrate 20 in a direction normal to the substrate surface 26, and the off-axis angle of the coupled wave inside the substrate 20 is $\alpha_{in}$, then the angle $\alpha_{sur2}$ between the reflecting surfaces and the substrate plane is:

$$\alpha_{sur2} = \frac{\alpha_{in}}{2}. \tag{4}$$

As can be seen in FIG. 2, the trapped rays arrive at the reflecting surfaces from two distinct directions 28, 30. In this particular embodiment, the trapped rays arrive at the reflecting surface from one of these directions 28 after an even number of reflections from the substrate surfaces 26, wherein the incident angle $\beta_{ref}$ between the trapped ray and the normal to the reflecting surface is:

$$\beta_{ref} = \alpha_{in} - \alpha_{sur2} = \frac{\alpha_{in}}{2} \tag{5}$$

The trapped rays arrive at the reflecting surface from the second direction 30 after an odd number of reflections from the substrate surfaces 26, where the off-axis angle is $\alpha'_{in} = 180° - \alpha_{in}$ and the incident angle between the trapped ray and the normal to the reflecting surface is:

$$\beta'_{ref} = \alpha'_{in} - \alpha_{sur2} = 180° - \alpha_{in} - \alpha_{sur2} = 180° - \frac{3\alpha_{in}}{2}. \tag{6}$$

In order to prevent undesired reflections and ghost images, the reflectance for one of these two directions should be negligible. The desired discrimination between the two incident directions can be achieved if one angle is significant smaller than the other one. It is possible to provide a coating with very low reflectance at high incident angles and a high reflectance for low incident angles. This property can be exploited to prevent undesired reflections and ghost images by eliminating the reflectance in one of the two directions. For example choosing $\beta_{ref}$~25° from Equations (5) and (6) it can be calculated that:

$$\beta'_{ref}=105°; \alpha'_{in}=50°; \alpha'_{in}=130°; \alpha_{sur2}=25°. \tag{7}$$

Figure 3A:
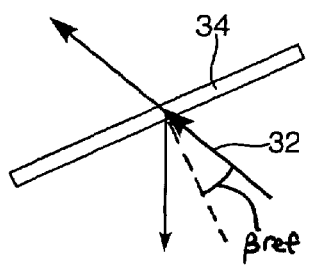
Figure 3B:
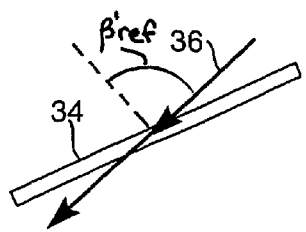

If now a reflecting surface is determined for which $\beta'_{ref}$ is not reflected but $\beta_{ref}$ is, the desired condition is achieved. FIGS. 3A and 3B illustrate the desired reflectance behavior of selectively reflecting surfaces. While the ray 32 (FIG. 3A), having an off-axis angle of $\beta_{ref}$~25°, is partially reflected and is coupled out of the substrate 34, the ray 36 (FIG. 3B), which arrives at an off-axis angle of $\beta'_{ref}$~75° to the reflecting surface (which is equivalent to $\beta'_{ref}$~105°), is transmitted through the reflecting surface 34 without any notable reflection.

FIGS. 4 and 5 show the reflectance curves of a dichroic coating designed to achieve the above reflectance characteristics, for four different incident angles: 20°, 25°, 30° and 75°, with P-polarized and S-polarized light respectively. While the reflectance of the high-angle ray is negligible over the entire relevant spectrum, the rays at off-axis angles of 20°, 25° and 30°, obtain almost constant reflectance of 26%, 29% and 32% respectively, for P-polarized light, and 32%, 28% and 25% respectively, for S-polarized light, over the same spectrum. Evidently, reflectance decreases with the obliquity of the incident rays for P-polarized light and increases for S-polarized light.

Figure 6:
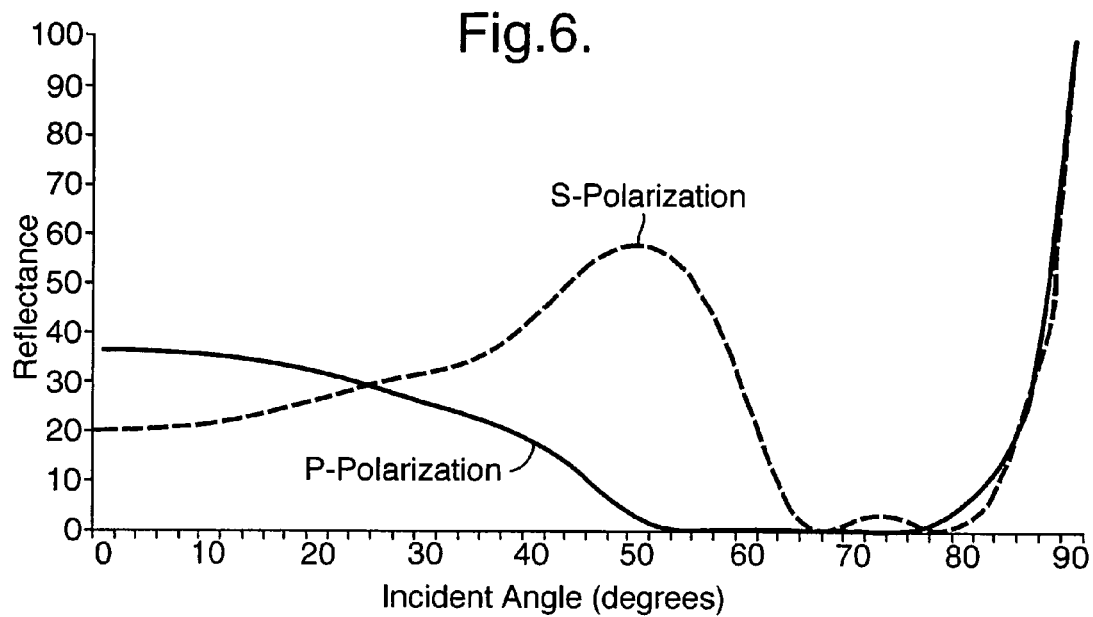

FIG. 6 illustrates the reflectance curves of the same dichroic coating, as a function of the incident angle for both polarizations at wavelength $\lambda=550$ nm. There are two significant regions in this graph: between 65° and 80° where the reflectance is very low, and between 15° and 40° where the reflectance changes monotonically with decreasing incident angles (increasing for P-polarized light and decreasing for S-polarized light). Hence, as long as one can ensure that the entire angular spectrum of $\beta'_{ref}$, where very low reflections are desired, will be located inside the first region, while the entire angular spectrum of $\beta_{ref}$, where higher reflections are required, will be located inside the second region, for a given FOV, one can ensure the reflection of only one substrate mode into the eye of the viewer and a ghost-free image.

There are some differences between the behaviors of the two polarizations. The main differences are that the region of high angles, where the reflectance is very low, is much narrower for the S-polarization and that it is much more difficult to achieve a constant reflectance for a given angle over the entire spectral bandwidth for the S-polarized light than for the P-polarized light. It is therefore preferable to design the LOE only for the P-polarized light. This would be satisfactory for a system using a polarized display source, such as an LCD, or for a system where the output brightness is not crucial and the S-polarized light can be filtered out. However, for an unpolarized display source, like a CRT or an OLED, or for a system where the brightness is critical, S-polarized light cannot be neglected and it must be taken into account during the design procedure. Another difference is that the monotonic behavior of the S-polarized light at the angular spectrum of $\beta_{ref}$, where higher reflections are required, is opposite to that of the P-polarized light, that is, the reflectance for the S-polarized light increases with the obliquity of the incident rays. This contradictory behavior of the two polarizations at the angular spectrum of $\beta_{ref}$ could be utilized during the optical design of the system to achieve the desired reflectance of the overall light according to the specific requirements of each system.

Assuming that the coupled wave illuminates the entire area of the reflecting surface, after reflection from the surface 16, it illuminates an area of $2S_1=2T \tan(\alpha)$ on the substrate surface. On the other hand, the projection of a reflection surface 22 on the substrate plane, is $S_2=T \tan(\alpha_{sur2})$. To avoid either overlapping or gaps between the reflecting surfaces, the projection of each surface is adjacent to its neighbor. Hence, the number N of reflecting surfaces 22 through which each coupled ray passes during one cycle (i.e., between two reflections from the same surface of the substrate) is:

$$N = \frac{2S_1}{S_2} = \frac{2T \cdot \cot(\alpha_{sur1})}{T \cdot \cot(\alpha_{sur2})}. \tag{8}$$

In this example, where $\alpha_{sur2}=25°$ and $\alpha_{sur1}=25°$, the solution is N=2; that is, each ray passes through two different surfaces during one cycle.

The embodiment described above with regard to FIG. 7 is an example of a method for coupling the input waves into the substrate. Input waves could, however, also be coupled into the substrate by other optical means, including, but not limited to, folding prisms, fiber optic bundles, diffraction gratings, and other solutions.

Also, in the example illustrated in FIG. 2, the input waves and the image waves are located on the same side of the substrate. Other configurations are envisioned in which the input and the image waves could be located on opposite sides of the substrate. It is also possible, in certain applications, to couple the input waves into the substrate through one of the substrate's peripheral sides.

Figure 7:
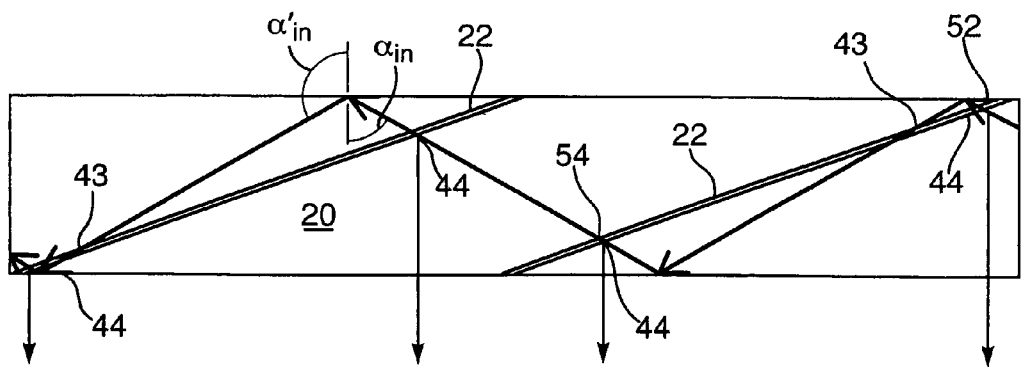

FIG. 7 is a detailed sectional view of an array of selectively reflective surfaces which couple light, trapped inside the substrate, out and into the eye of a viewer. As can be seen, in each cycle the coupled ray passes through reflecting surfaces 43, at an angle of $\alpha'_{in}=130°$, whereby the angle between the ray and the normal to the reflecting surfaces is ~75°. The reflections from these surfaces are negligible. In addition, the ray passes twice through the reflecting surface 44, in each cycle, at an angle of $\alpha_{in}=50°$, where the incident angle is 25°. Part of the energy of the ray is coupled out of the substrate. Assuming that one array of two selectively reflecting surfaces 22 is used to couple the light onto the eye of a viewer, the maximal FOV is:

$$FOV_{max} \approx \frac{2T\tan\alpha_{sur1} - d_{eye}}{R_{eye}}. \qquad (9)$$

Hence, for the same parameters of the examples above, the limiting substrate thickness for an FOV of 8° is in the order of 2.8 mm; for FOVs of 15° and 30°, the limiting substrate thickness is 3.7 mm and 5.6 mm, respectively. These are more favorable values than the limiting thickness of the state-of-the-art solutions discussed above. Moreover, more than two selectively reflecting surfaces can be used. For example, for three selectively reflecting surfaces 22, the limiting substrate thickness for FOVs of 15° and 30° is approximately 2.4 mm and 3.9 mm, respectively. Similarly additional reflecting surfaces may be introduces to, amongst other advantages, reduce the limiting optical thickness further.

For configuration where a relatively small FOV is required, a single partially reflecting surface can be sufficient. For example, for a system with the following parameters: $R_{eye}=25$ mm; $\alpha^{sur}=72°$ and T=5 mm, a moderate FOV of 17° can be achieved even with a single reflecting surface 22. Part of the rays will cross the surface 22 several times before being coupled out into the desired direction. Since the minimal propagation angle inside the substrate to achieve the total-internal reflection condition for BK7 material or similar is $\alpha_{in(min)}=42°$, the propagation direction of the central angle of the FOV is $\alpha_{in(cen)}=48°$. Consequently, the projected image is not normal to the surface but is rather inclined to 12° off-axis. Nevertheless, for many applications this is acceptable.

Unfortunately, this solution is not always feasible. For many other applications there is a constraint that the projected image should be normal to the substrate surface. Another problem, which is associated with the total internal reflection condition, is the maximal FOV of the image that can be trapped inside the substrate. Unfortunately, it is very difficult to achieve very low reflectance for off-axis angles exceeding 82°. Assuming that the required FOV angle inside the substrate is $\alpha_{FOV}$, the maximal incident angle between the central wave and the normal to the reflecting surface is $$\beta'_{ref} = 82° - \frac{\alpha_{FOV}}{2}. \qquad (10)$$

Assuming an external FOV of 30°, which corresponds to $\alpha_{FOV}$~20° inside the substrate, yields $\beta'ref=72°$. Inserting this value into Eq. (6) yields $\alpha_{in}=48°$, and hence the minimal required angle of the trapped wave is $$\alpha_{in(min)} = \alpha_{in} - \frac{\alpha_{FOV}}{2} = 38°. \qquad (11)$$

Clearly, this angle cannot be trapped inside BK7 or other similar materials. It is true that there are flint optical materials with higher refractive indices, which can exceed 1.8, however, the transparency of these materials is usually not high enough for substrate-mode optical elements. Another possible solution is to coat the substrate surfaces not with regular anti-reflection coatings but with angular-sensitive reflecting coatings that trap the entire FOV inside the substrate even for lower angles than the critical angle. It must be noted that even for a non see-through application, where one of the substrate surfaces can be opaque and hence can be coated with a conventional reflecting surface, the other surface, the one which is next to the eyes of the viewer, should be transparent, at least for the angles of the required external FOV. Therefore, the required reflecting coating should have very high reflectance for the region of angles lower than the critical angle and very high reflectance for the entire FOV of the image.

Figure 8:
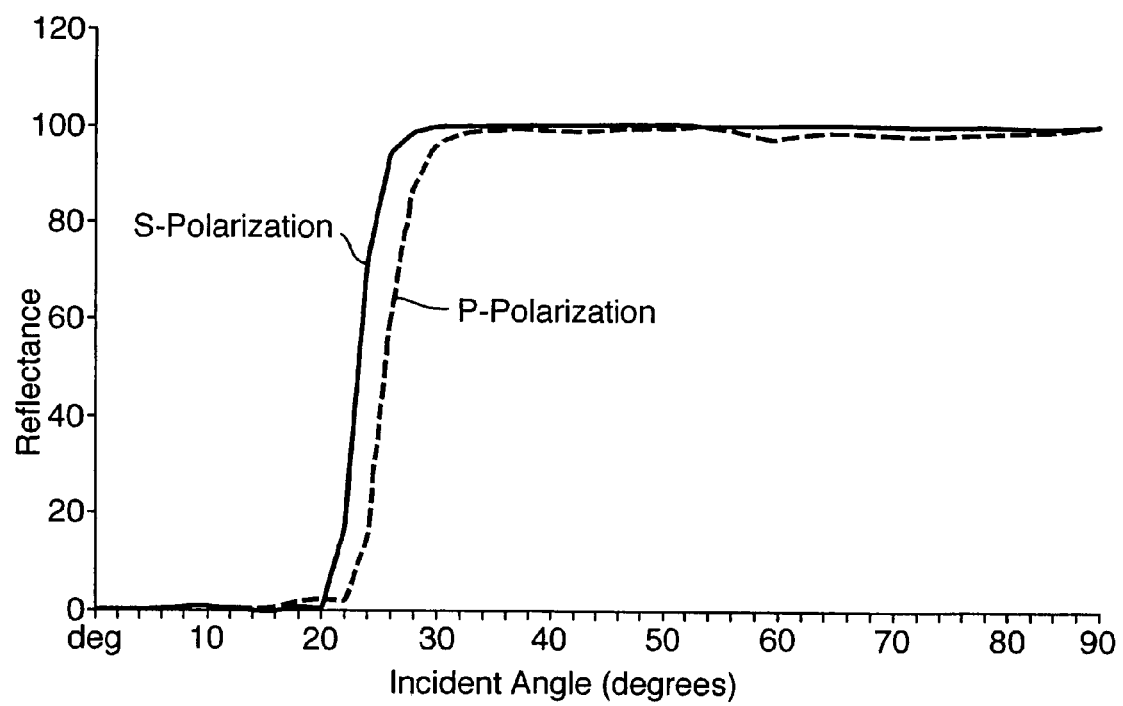

FIG. 8 shows the reflectance curves of a dichroic coating designed to achieve the above reflectance characteristics, as a function of the incident angle, for both polarizations at the wavelength $\lambda=550$ nm, where the angle is measured in air. Evidently, there are two significant regions in this graph: between 30° and 90° (equivalent to 20°-42° inside the substrate) where the reflectance is very high; and between 0° and 22° (equivalent to 0°-15° inside the substrate) where the reflectance is very low. Hence, as long as one can ensure that the entire angular spectrum of $\alpha_{in}$, where very high reflections are desired, will be located inside the first region, while the entire angular spectrum of exterior FOV, where essentially zero reflections are required, will be located inside the second region, for a given FOV, one can ensure that the entire FOV will be trapped inside the substrate by internal reflections and that the viewer can see the whole image. It is important to note that since the fabrication process of the LOE usually involves cementing optical elements and since the required angular-sensitive reflecting coating is applied to the substrate surface only after the LOE body is complete, it is not possible to utilize the conventional hot-coating procedures that may damage the cemented areas. Fortunately, novel thin-film technologies, as ion-assisted coating procedures, can also be used for cold processing. Eliminating the need to heat parts allows cemented parts, such as LOEs, to be safely coated.

In general, LOE offer several important advantages over alternative compact optics for display applications, which include:

1) The input display source can be located very close to the substrate, so that the overall optical system is very compact and lightweight, offering an unparalleled form-factor.

2) In contrast to other compact display configurations, the present invention offers flexibility as to location of the input display source relative to the eyepiece. This flexibility, combined with the ability to locate the source close to the expanding substrate, alleviates the need to use an off-axis optical configuration that is common to other display systems. In addition, since the input aperture of the LOE is much smaller than the active area of the output aperture, the numerical aperture of the collimating lens 6 is much smaller than required for a comparable conventional imaging system. Consequently a significantly more convenient optical system can be implemented and the many difficulties associated with off-axis optics and high numerical-aperture lenses, such as field or chromatic aberrations can be compensated for relatively easily and efficiently.

3) The reflectance coefficients of the selectively reflective surfaces in the present invention are essentially identical over the entire relevant spectrum. Hence, both monochromatic and polychromatic, light sources may be used as display sources. The LOE has a negligible wavelength-dependence ensuring high-quality color displays with high resolutions.

4) Since each point from the input display is transformed into a plane wave that is reflected into the eye of the viewer from a large part of the reflecting array, the tolerances on the exact location of the eye can be significantly relaxed. As such, the viewer can see the entire FOV, and the EMB can be significantly larger than in other compact display configurations.

5) Since a large part of the intensity from the display source is coupled into the substrate, and since a large portion of this coupled energy is "recycled" and coupled out into the eye of the viewer, a display of comparatively high brightness can be achieved even with display sources with low power consumption.

Figure 9:
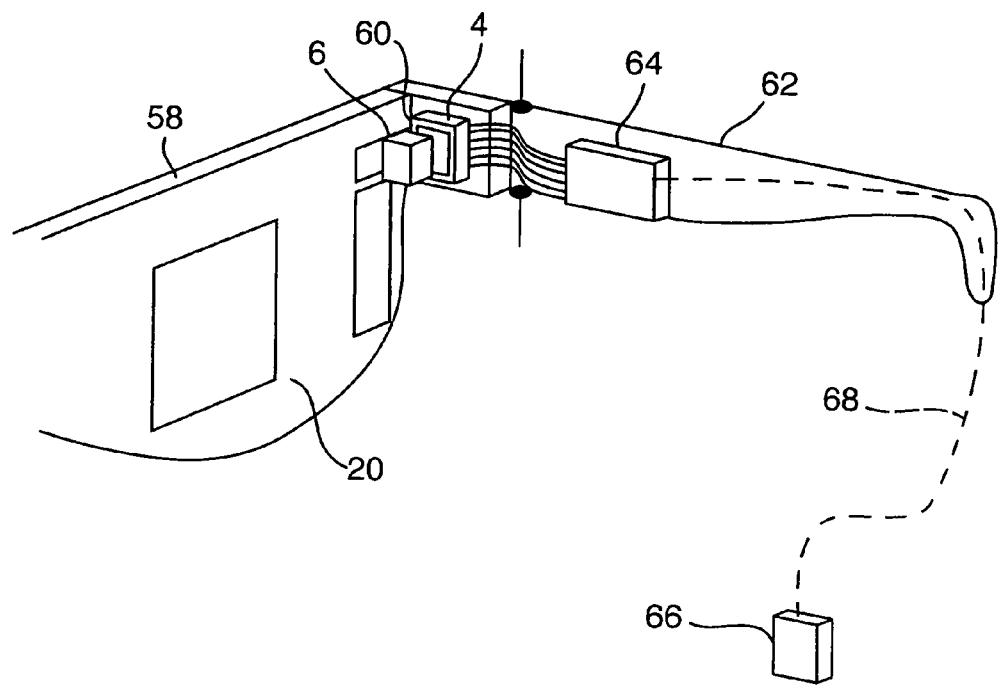

FIG. 9 illustrates an embodiment of the present invention in which the LOE 20 is embedded in an eye-glasses frame 58. The display source 4, the collimating lens 6, and the folding lens 60 are assembled inside the arm portions 62 of the eye-glasses frame, just next to the edge of the LOE 20. For a case in which the display source is an electronic element such as a small CRT, LCD, or OLED, the driving electronics 64 for the display source might be assembled inside the back portion of the arm 62. A power supply and data interface 66 is connectable to arm 62 by a lead 68 or other communication means including radio or optical transmission. Alternatively, a battery and miniature data link electronics can be integrated in the eye-glasses frame.

The embodiment described above can serve in both see-through and non-see-through systems. In the latter case opaque layers are located in front of the LOE. It is not necessary to occlude the entire LOE, typically only the active area, where the display is visible needs to be blocked. As such, the device can ensure that the peripheral vision of the user is maintained, replicating the viewing experience of a computer or a television screen, in which such peripheral vision serves an important cognitive function. Alternatively, a variable filter can be placed in front of the system in such a way that the viewer can control the level of brightness of the light emerging from the external scene. This variable filter could be either a mechanically controlled device such as a folding filter, or two rotating polarizers, an electronically controlled device, or even an automatic device, whereby the transmittance of the filter is determined by the brightness of the external background. One method to achieve the required variable transmittance filter is to use electrochromic materials in order to provide electrical control of optical transmittance, wherein materials with electrically controllable optical properties are incorporated into laminated structures.

There are some alternatives as to the precise way in which an LOE can be utilized in this embodiment. The simplest option is to use a single element for one eye. Another option is to use an element and a display source for each eye, but with the same image. Alternatively it is possible to project two different parts of the same image, with some overlap between the two eyes, enabling a wider FOV. Yet another possibility is to project two different scenes, one to each eye, in order to create a stereoscopic image. With this alternative, attractive implementations are possible, including 3-dimensional movies, advanced virtual reality, training systems and others.

The embodiment of FIG. 9 is just an example illustrating the simple implementation of the present invention. Since the substrate guided optical element, constituting the core of the system, is very compact and lightweight, it could be installed in a vast variety of arrangements. Hence many other embodiments are also possible including a visor, a folding display, a monocle, and many more. This embodiment is designated for applications where the display should be near-to-eye: head-mounted, head-worn or head-carried.

The embodiment described above is a mono-ocular optical system, that is, the image is projected onto a single eye. There are, however, applications, such as head-up displays (HUD), wherein it is desired to project an image onto both eyes. Until recently, HUD systems have been used mainly in advanced combat and civilian aircraft. There have been numerous proposals and designs, of late, to install a HUD in front of a car driver in order to assist in driving navigation or to project a thermal image into his eyes during-low-visibility conditions. Current aerospace HUD systems are very expensive, the price of a single unit being in the order of hundreds of thousands of dollars. In addition, the existing systems are very large, heavy, and bulky, and are too cumbersome for installation in a small aircraft let alone a car. LOE-based HUD potentially provide the possibilities for a very compact, self-contained HUD, that can be readily installed in confined spaces. It also simplifies the construction and manufacturing of the optical systems related to the HUD and therefore is a potentially suitable for both improving on aerospace HUD's, as well as introducing a compact, inexpensive, consumer version for the automotive industry.

Figure 10:
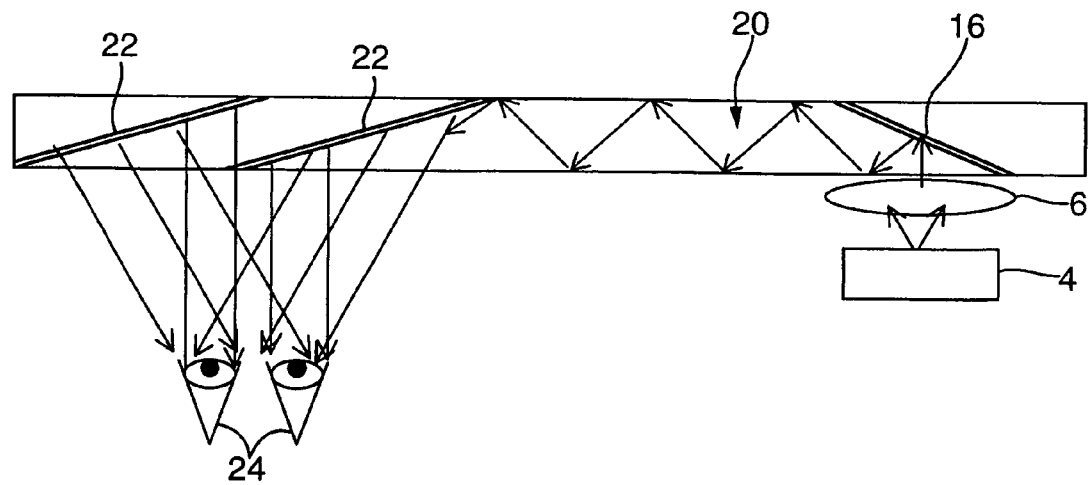

FIG. 10 illustrates a method of materializing an HUD system based on the present invention. The light from a display source 4 is collimated by a lens 6 to infinity and coupled by the first reflecting surface 16 into substrate 20. After reflection at a second reflecting array (not shown), the optical waves impinge on a third reflecting surfaces 22, which couples the light out into the eyes 24 of the viewer. The overall system can be very compact and lightweight, of the size of a large postcard having a thickness of a few millimeters. The display source, having a volume of a few cubic centimeters, can be attached to one of the corners of the substrate, where an electric wire can transmit the power and data to the system. It is expected that the installation of the presented HUD system will not be more complicated than the installation of a simple commercial audio system. Moreover, since there is no need for an external display source for image projection, the necessity to install components in unsafe places is avoided.

The embodiments illustrated in FIG. 10 can be implemented for other applications, in addition to HUD systems for vehicles. One possible utilization of these embodiments is as a flat display for a computer or television. The main unique characteristic of such a display is that the image is not located at the screen plane, but is focused at infinity or to a similarly convenient distance. One of the main drawbacks of existing computer displays is that the user has to focus his eyes at a very close distance of between 40 and 60 cm, while the natural focus of a healthy eye is to infinity. Many people suffer from headaches after working for a long duration of time at a computer. Many others who work frequently with computers tend to develop myopia. In addition, some people, who suffer from both myopia and hyperopia, need special spectacles for work with a computer. A flat display, based on the present invention, could be an appropriate solution for people who suffer from the above-described problems and do not wish to work with a head-mounted display. Furthermore, the present invention allows for a significant reduction in the physical size of the screen. As the image formed by the LOE is larger than the device, it would be possible to implement large screens on smaller frames. This is particularly important for mobile applications such as lap and palm-top computers.

Yet another possible implementation of this embodiment is as a screen for a personal digital assistance (PDA). The size of the existing conventional screens which are presently used, is under 10 cm. Since the minimal distance where these displays can be read is on the order of 40 cm, the obtainable FOV is under 15°; hence, the information content, especially as far as text is concerned, on these displays is limited. A significant improvement in the projected FOV can be made with the embodiment illustrated in FIG. 10. The image is focused at infinity, and the screen can be located much closer to the eyes of the viewer. In addition, since each eye sees a different part of the total filed-of-view (TFOV), with an overlap at its center, another increase in the TFOV may be achieved. Therefore, a display with an FOV of 40° or larger is feasible.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An optical device, comprising:
   a light-transmitting substrate having at least two major surfaces parallel to each other and edges;
   a first optical element for coupling light waves located in a field-of-view into said substrate by internal reflection; and
   a second optical element for coupling said light waves out of said substrate, characterized in that at least one of said major surfaces is coated with an angular sensitive coating.

2. The optical device according to claim 1, wherein said first optical element is a wave-reflecting surface.

3. The optical device according to claim 1, wherein said first optical element is a folding prism.

4. The optical device according to claim 1, wherein said first optical element for coupling light waves into said substrate to be transmitted therein by internal reflection is a diffraction grating.

5. The optical device according to claim 1 wherein said second optical element is located in said substrate.

6. The optical device according to claim 1, wherein said at least one coated major surface has a negligible reflection for one part of an angular spectrum and a noticeable reflection for other parts of the angular spectrum.

7. The optical device according to claim 1, wherein said at least one coated major surface has a low reflectance at low incident angles and a high reflectance at high incident angles.

8. The optical device according to claim 1, wherein said angular sensitive coating causes said field-of-view to be trapped inside said substrate by internal reflections.

9. The optical device according to claim 1, wherein said two major surfaces are coated with an angular sensitive coating.

10. The optical device according to claim 9, wherein said two major surfaces are coated with the same angular sensitive coating.

11. The optical device according to claim 1, wherein said second optical element causes said field-of-view to exit said substrate at a predetermined location for reaching at least one eye of an observer.

12. The optical device according to claim 1, wherein said angular sensitive coating is formed by utilizing an ion-assisted coating procedure.

13. The optical device according to claim 1, further comprising a display light source.

14. The optical device according to claim 1, wherein said substrate is partially transparent, to enable see-through operation.

15. The optical device according to claim 1, wherein said device is mounted in an eyeglasses frame.

16. The optical device according to claim 1, wherein said device is located in a head-up-display.

* * * * *